No. 739,276. PATENTED SEPT. 22, 1903.
W. L. ALLEN.
MACHINE FOR CORRUGATING PAPER.
APPLICATION FILED MAY 12, 1902.
NO MODEL. 8 SHEETS—SHEET 2.

No. 739,276. PATENTED SEPT. 22, 1903.
W. L. ALLEN.
MACHINE FOR CORRUGATING PAPER.
APPLICATION FILED MAY 12, 1902.
NO MODEL. 8 SHEETS—SHEET 3.

WITNESSES
Frank S. Dewire
May F. Ritchie.

INVENTOR
Walter L. Allen,
BY his ATTORNEY
Frank H. Allen.

No. 739,276. PATENTED SEPT. 22, 1903.
W. L. ALLEN.
MACHINE FOR CORRUGATING PAPER.
APPLICATION FILED MAY 12, 1902.
NO MODEL. 8 SHEETS—SHEET 5.

No. 739,276. PATENTED SEPT. 22, 1903.
W. L. ALLEN.
MACHINE FOR CORRUGATING PAPER.
APPLICATION FILED MAY 12, 1902.
NO MODEL. 8 SHEETS—SHEET 8.

WITNESSES

INVENTOR,
Walter L. Allen,
BY HIS ATTORNEY

No. 739,276.

Patented September 22, 1903.

UNITED STATES PATENT OFFICE.

WALTER L. ALLEN, OF NORWICH, CONNECTICUT.

MACHINE FOR CORRUGATING PAPER.

SPECIFICATION forming part of Letters Patent No. 739,276, dated September 22, 1903.

Application filed May 12, 1902. Serial No. 107,007. (No model.)

*To all whom it may concern:*

Be it known that I, WALTER L. ALLEN, a citizen of the United States, residing at Norwich, county of New London, and State of Connecticut, have invented certain new and useful Improvements in Machines for Corrugating Paper, of which the following is a full, clear, and exact description.

This invention is in machinery for corrugating and plaiting paper and the like materials, and my immediate purpose is to provide automatic mechanism that will receive the paper in the form of a web and corrugate the same with a continuous (non-intermittent) operation, the corrugations being formed parallel with the direction in which the paper passes through the machine instead of transversely to the movement of the web of paper, as has been most common heretofore.

The machine here illustrated is designed to manufacture a product which is first corrugated and then flattened to form plaits that are more or less resilient, said product being specially valuable for use as bottle-wrappers and for separators or partitions for egg-cases.

The annexed drawings illustrate my newly-invented machine, as follows:

Fig. 6 is a plan view of a portion of a sheet-metal form over which the paper travels upon its introduction into the machine. Fig. 8 shows a portion of the end of one of the flexible rolls in section to better disclose the manner in which it is supported and driven. Figs. 19 and 20 are cross-sectional views taken on the lines 19 19 and 20 20, respectively, of Fig. 17.

Referring to the drawings, the letters $a$ $a'$ denote the side frames of my newly-invented machine, said frames being connected and stiffened by suitable tie-rods $a^2$. The initial driving-shaft (from which power and motion are distributed to the several operative elements of the machine) is located in bearings at the lower central part of said machine and is indicated by the letter $b$.

Mounted on one end of the shaft $b$ is a fast pulley $b'$ and a loose pulley $b^2$, and fixedly mounted upon the other end of said shaft are sprocket-wheels $b^3$ $b^4$.

Mounted to revolve in bearings at the upper rear end of the machine is a shaft $c$, one of whose ends has secured thereto a sprocket-wheel $c'$, that is connected with the sprocket $b^4$ by a drive-chain $d$.

Journaled on the upper front end portion of the machine are rolls $e\ e'$, the projecting ends of whose journals have fixed thereon sprocket-wheels $e^2\ e^3$, that are connected with the sprocket $b^3$ by a drive-chain $d'$ in such manner that the revolution of shaft $b$ will impart motion in the same direction to the said rolls $e\ e'$. The projecting journal of roll $e'$ is also preferably provided with a suitable hand-wheel $e^4$, and a suitable belt-tightener $f$ is provided, by means of which all undue slackness of the chain $d'$ may be readily taken up.

Figure 1:
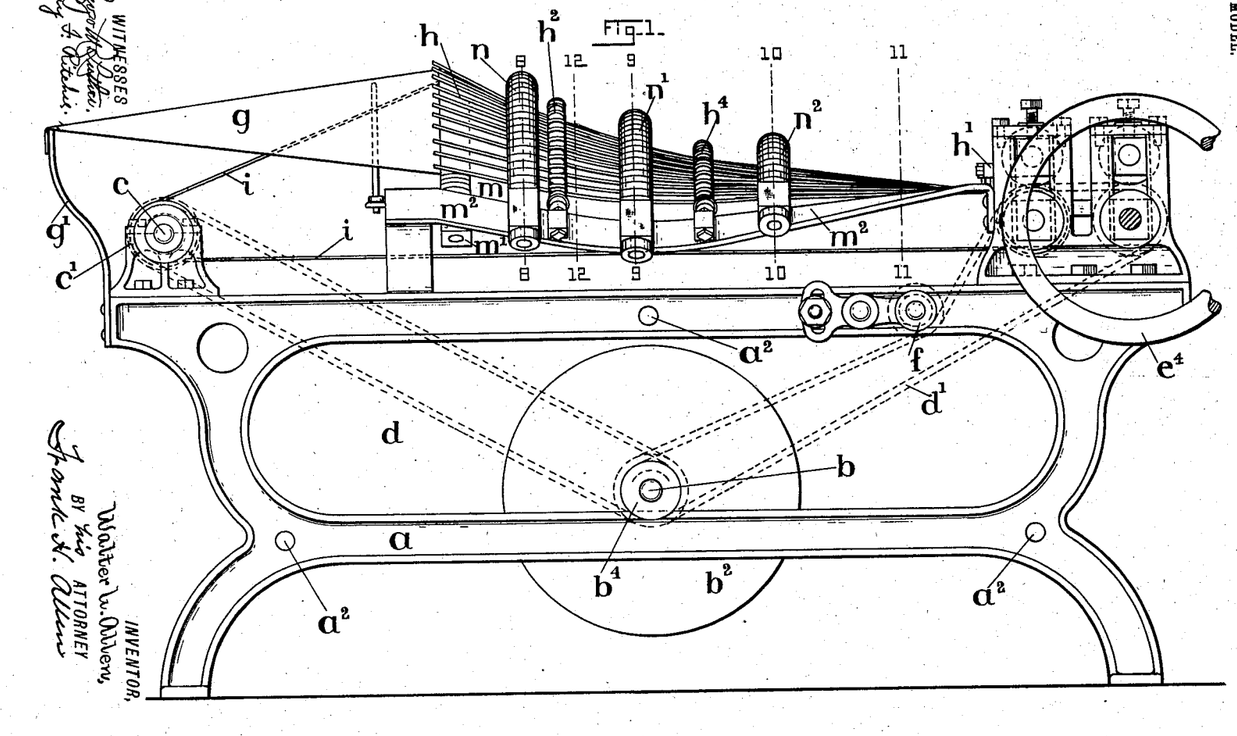
Figure 1 is a side elevation of the machine.
Figure 2:
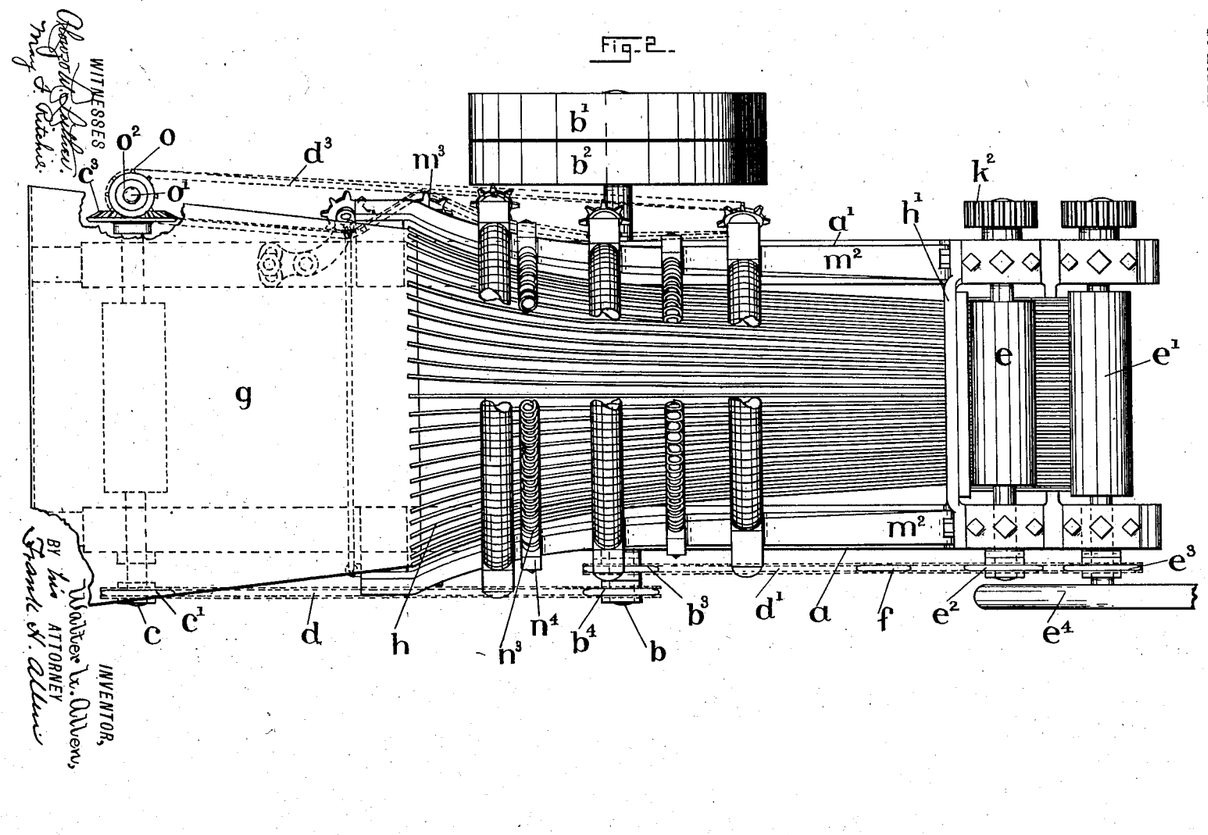
Fig. 2 is a plan view.
Figure 3:
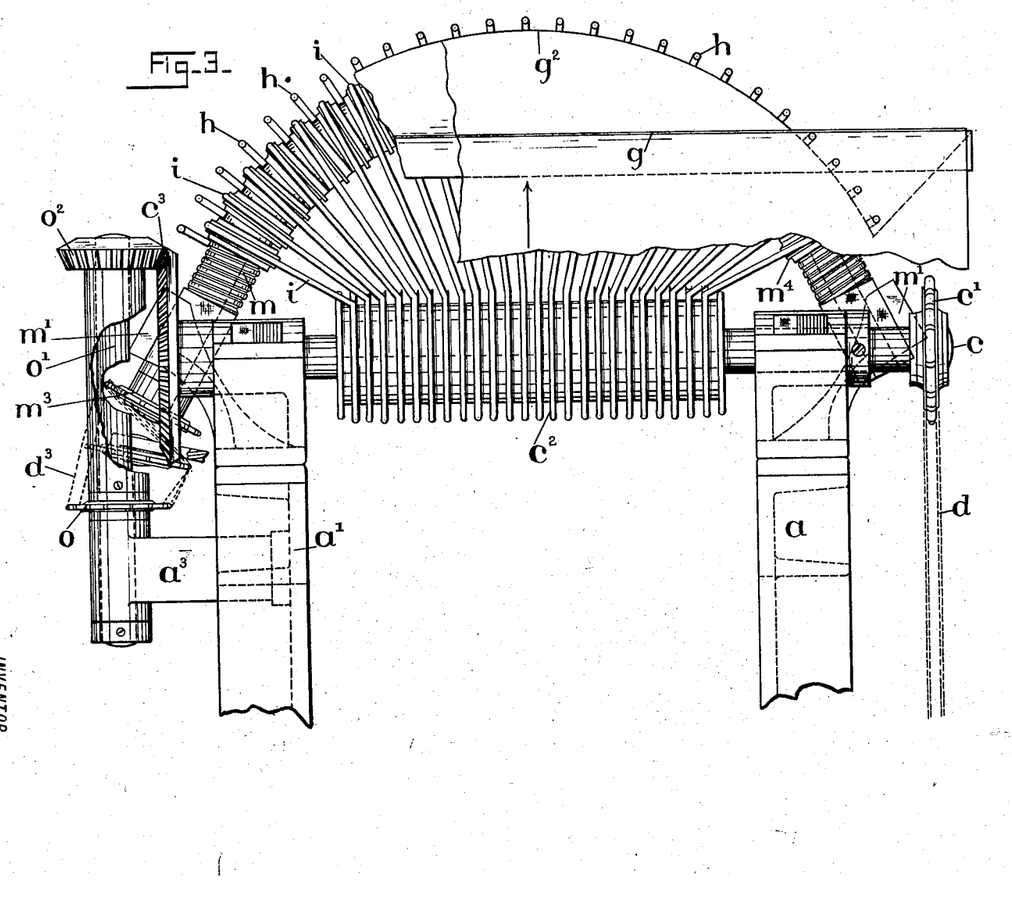
Fig. 3 is an end elevation showing a portion of the machine as viewed from the end at which the paper is introduced.
Figure 4:
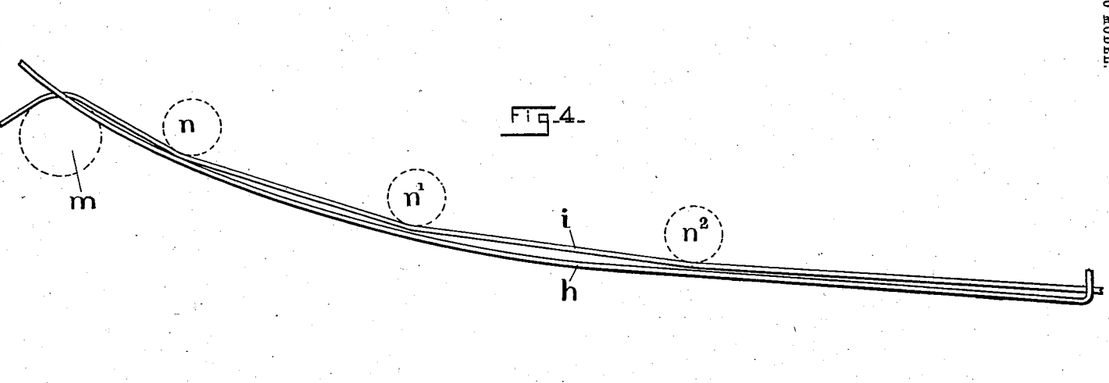
Figs. 4 and 5 show in elevation and plan, rsepectively, certain curved rods and belting coacting therewith by means of which the crimping or corrugating of the paper is effected, the said views being on a somewhat enlarged scale.
Figure 5:
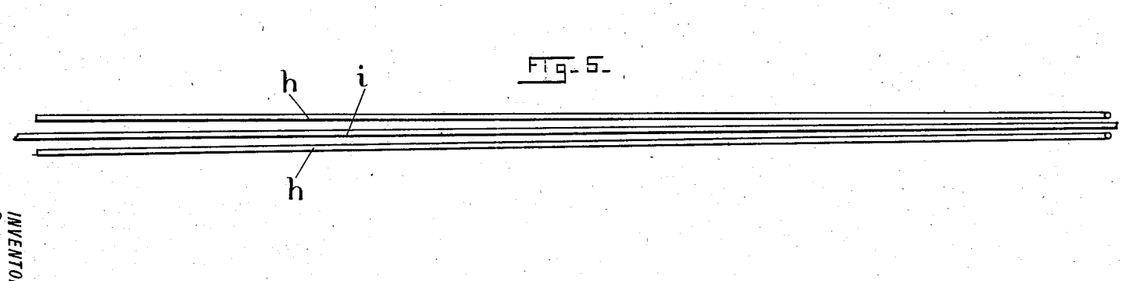
Figure 7:
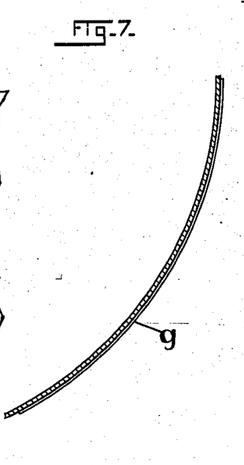
Fig. 7 is a cross-sectional view taken on the line 7 7 of Fig. 6 looking in the direction of the arrow of the last-named figure, in which direction also the paper travels.
Figure 8:
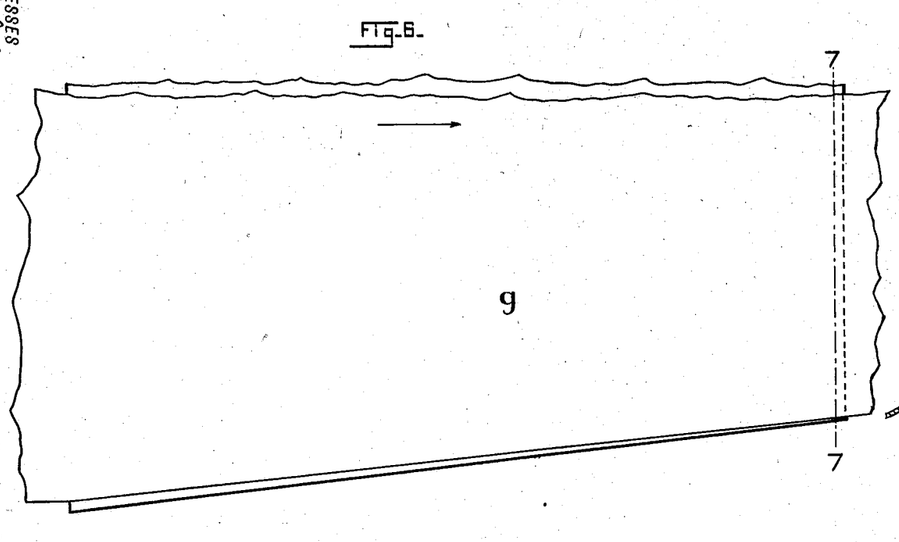
Figs. 8, 9, 10, and 11 are cross-sectional views taken, respectively, on the lines 8 8, 9 9, 10 10, and 11 11 of Fig. 1, said views showing approximately one-half of a form composed of the said curved rods of Figs. 4 and 5, which rods, in connection with certain belts, (also shown in section,) effect the corrugating of the paper, as before mentioned. The said views 8, 9, 10, and 11 show also certain flexible rolls which are engaged by the said belts and which serve to hold the latter in proper relation to the said rods.
Figures 8, 9, 10, 11, 12, 13, 14, 15, 16:
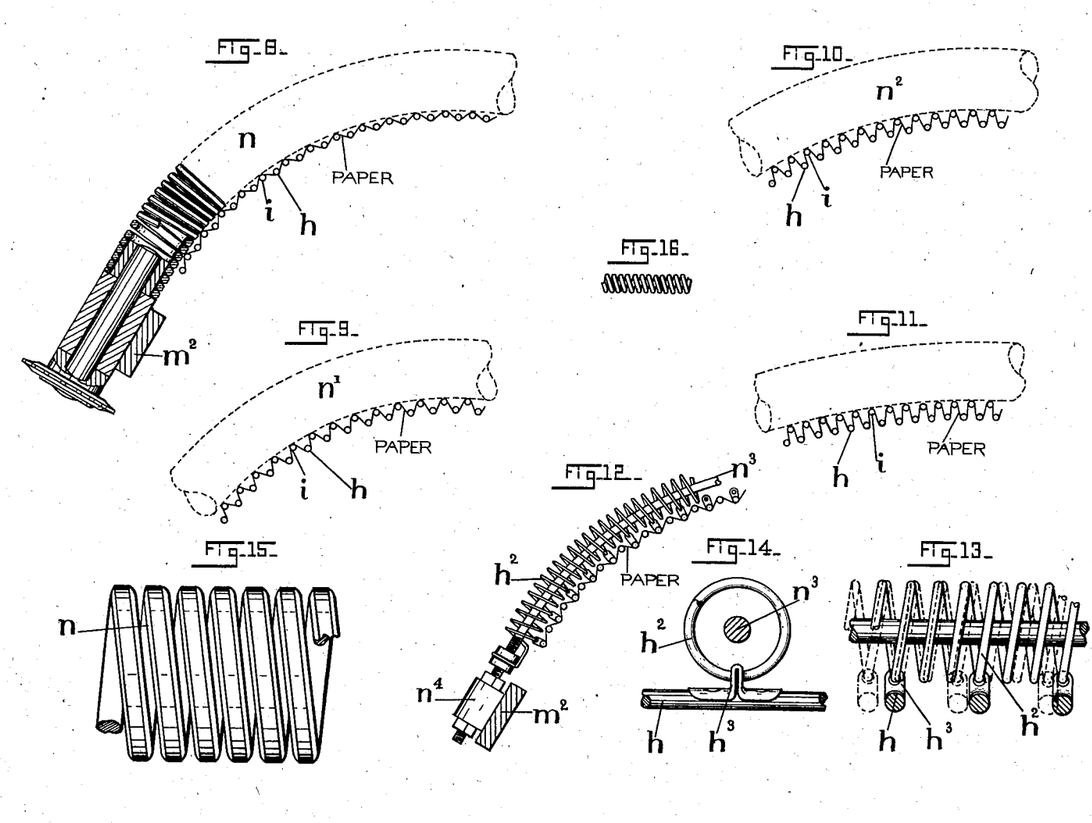
Fig. 12 is a cross-sectional view taken on the line 12 12 of Fig. 1, showing approximately one-half of the form composed of the curved rods before mentioned and shows also means provided for the adjusting of the said rods simultaneously and at uniform distances apart.
Fig. 13 is an enlarged view of a portion of the rod-supporting mechanism shown in Fig. 12.
Fig. 14 is an end view of the mechanism of Fig. 13.
Fig. 15 shows in elevation a short section of one of the flexible rolls.
Fig. 16 is a like view of the spiral-spring belting which is preferably employed.

Located immediately over the shaft $c$ is a moldboard $g$, whose rear edge portion is supported by standards $g'$, secured to the machine-frames $a\ a'$, said rear edge being straight, as seen in Figs. 1, 2, and 3. That portion of the said moldboard that extends forward—that is to say, toward the opposite end of the machine—is gradually transformed from the straight edge above referred to to the curved form shown at $g^2$ in Fig. 3. The said moldboard receives and supports the web of paper when the latter is first introduced into the machine, and the paper, which is drawn taut and smooth as it passes along the upper surface of said board, is thus given its initial molding—that is to say, it is gradually changed from its original flat form and becomes approximately semicircular in transverse section just as it is presented to the action of the corrugating mechanism proper, which corrugating mechanism consists, in brief, of a system of fixed rods $h$, that extend from the curved end $g^2$ of the moldboard to the roll $e$, and a coacting system of flexible belts $i$, that alternate in position with the said fixed rods. (See Figs. 3, 4, 5, 8, 9, 10, 11, and 12.) The rear ends of the several rods $h$ are upturned and elevated slightly above the curved edge $g^2$ of the moldboard, so that the paper as it is fed along over the moldboard may readily pass under the said upturned ends. The several belts $i$ are preferably of the spiral-spring flexible form in order that they may follow indirect torsional courses, as I shall explain later, and said belts are mounted at their rear portions on score-pulleys $c^2$, carried by the shaft $c$, and at their front portions are supported by similar score-pulleys $k'$, carried by a shaft $k$, that is journaled immediately below the roll $e$, already described, the roll $e$ and score-pulleys $k'$ being connected, and thus caused to travel in unison, by gears $k^2$. The front ends of the rods $h$ are bent upward and are fixedly secured in a cross-bar $h'$, that is bolted to the journal-stands that support the rolls $c\ k$. (See Figs. 1, 2, 17, and 19.)

By referring to Figs. 1, 2, and 3 it will be seen that the rods $h$ are arranged at their rear ends in an arc that conforms to the curved portion $g^2$ of the moldboard, while their front ends are drawn in toward each other and are arranged in a line that is parallel with their supporting-bar $h'$. In other words, the said rods are gradually drawn together and transformed in transverse section from the curved form of their rear ends to the flat form finally assumed by their front ends. I have already stated that the front ends of the rods $h$ are supported by the bar $h'$. The said rods are suspended and supported in proper relation to each other near their rear free ends by suspension-rings $h^2$, coiled about a curved wire $n^3$, whose ends are secured in stands $n^4$, fixedly mounted on plates $m^2$, that extend along opposite sides of the machine. (See Figs. 1 and 2.) The rods $h$ are suspended from the coils $h^2$ by means of metallic eyes $h^3$, that are strung upon the said coils, their lower portions being riveted or otherwise fastened to the upper sides of the rods $h$, thus leaving the lower half portion of said rods free for the unobstructed passage of the paper during the operation of corrugating the latter. Should it become necessary to vary the relative distances apart of the rods $h$, (which distances govern the final depth of the corrugations,) the coils of the spring-rings $h^2$ may be drawn together or separated by contracting or expanding the said spring, as indicated by dotted lines in Fig. 13. A similar means for suspending and supporting the rods $h$ is preferably provided at $h^4$ between the described suspension device and the front ends of said rods. The plates $m^2$ also serve to support the journal-bearings of several flexible shafts, which I will now refer to, which shafts are provided chiefly to guide the flexible belts $i$ and keep them in proper relation to the fixed rods $h$. As here shown, three flexible shafts $n$, $n'$, and $n^2$ are provided, all of which are journaled in stands that are secured to the plates $m^2$. The said flexible shafts are provided with sprockets, as seen in Fig. 2, which sprockets are driven positively by a chain $d^3$, which in turn is driven by a sprocket-wheel $o$, mounted on a vertical stud $o'$, that is journaled in a bracket-bearing $a^3$, secured to the machine-frame $a'$, as is best seen in Fig. 8. The stud $o'$ also bears a bevel-gear $o^2$, that meshes with and is driven by a bevel-gear $c^3$ on the end of shaft $c$, and it will now be understood that when the shaft $c$ is set in revolution gears $c^3\ o^2$ will impart rotary motion to the stud $o'$ and the attached sprocket $o$, which latter, acting through the chain $d^3$, will transmit such motion to the several sprockets of the flexible shafts $n$, $n'$, and $n^2$.

No particular number of the described flexible shafts is required, it being only necessary that a sufficient number and proper arrangement of such shafts be provided to cause the paper to follow substantially the curved course of the flexible belts $i$ and rods $h$. If the flexible shafts or some other suitable restraining means like frictional drags were not provided, the paper during its passage through the machine would seek to straighten itself between the rear and front ends of the rods $h$ instead of following the curved course of said rods, resulting in cracking or tearing said paper, and thus spoiling the product of the machine.

The flexible shaft $m$, which has already been briefly referred to, bears a sprocket $m^3$, that is also driven by the chain belt $d^3$, said belt being so supported and guided that it may follow a tortuous course, and thus engage the sprockets of the several flexible shafts. The shaft $m$ carries score-pulleys $m^4$, equaling in number the flexible belts $i$, which score-pulleys serve to support the said belts and to retain them in proper positions intermediate the rear ends of the fixed rods $h$, shaft $m$ being located under or near the curved front edge of the moldboard and curved to correspond with the curve of said board. After the flexible belts $i$ leave the controlling influence of the said score-pulleys $m^4$ they (the belts) lie between the rods $h$ and are thus forced to follow the course of said rods until they reach and pass around the score-pulleys $k'$, whence they return to the score-pulleys $c^2$ in a right line, as illustrated in Fig. 1.

Figure 25:
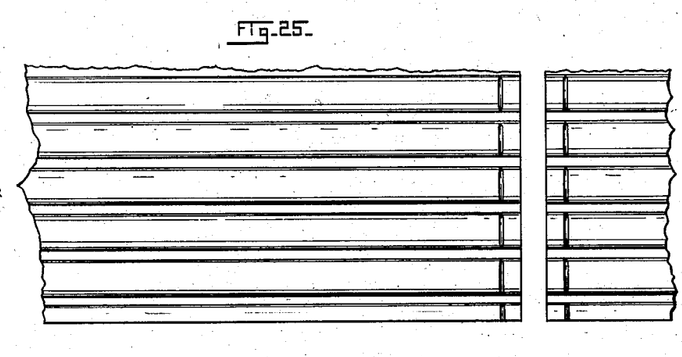
Fig. 25 is a plan view of the completed paper.

Adjacent to the cross-bar $h'$, which supports the front ends of the rods $h$, is a similar bar $p$, in which are fixed the upturned rear ends of certain rods $p'$, that form extensions of the main rods $h$ and reach forward between the rolls $e$ $k'$ to points immediately in the rear of the rolls $e'$ $e^5$, which latter rolls are out of contact with each other, but sufficiently near to squeeze together and compress the corrugated paper into flattened plaits. Rolls $e'$ $e^5$ are geared together and are provided at suitable points in their perimeters with coacting knives $q$ $q'$, that cut off a given length of the plaited paper at each complete revolution of the said rolls, and at each side of the said cutters are grooves $q^2$ on one roll, that coact with projections $q^3$ on the companion roll to squeeze together the plaited ends adjacent to the severed ends, as seen in Fig. 25, thus preventing, or rather hindering, the free expansion of the flattened plaits.

Figure 17:
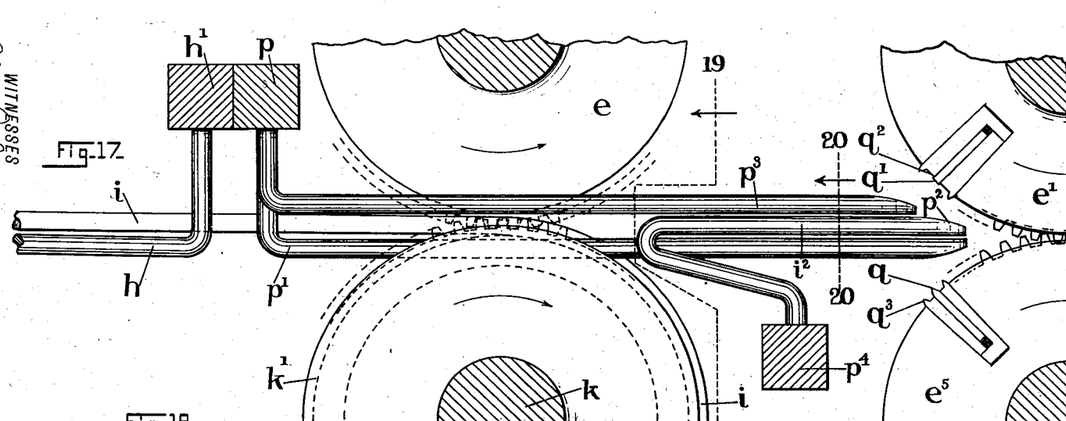
Figs. 17 and 18 show in elevation and plan a portion of the mechanism at the delivery end of the machine.
Figure 18:
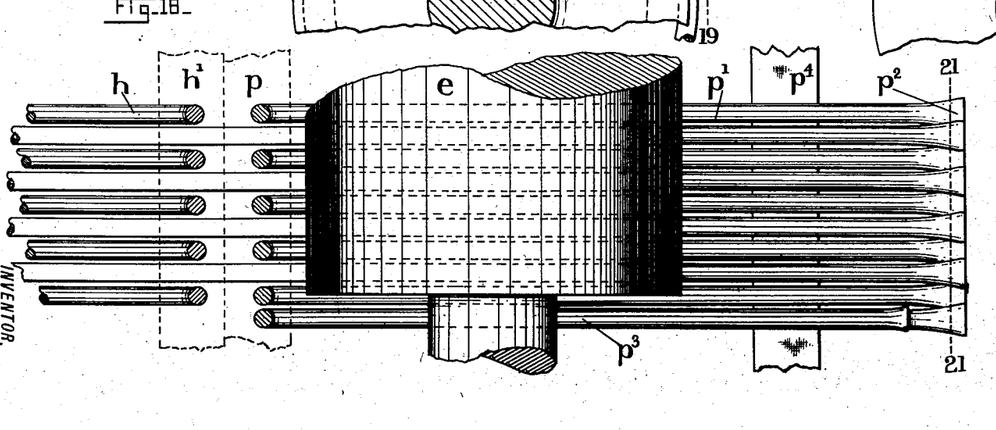
Figure 20:
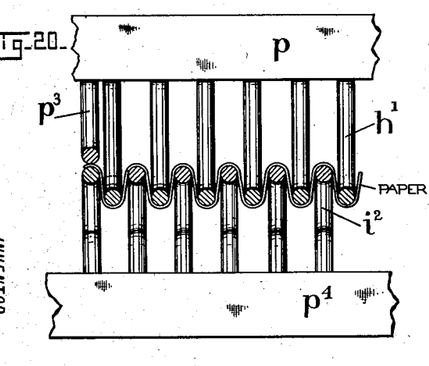
Figure 21:
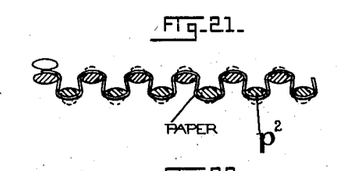
Fig. 21 is a cross-sectional view taken on the line 21 21 of Fig. 18.
Figure 22:
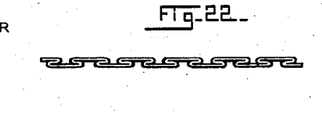
Fig. 22 shows the paper after having passed through a certain pair of compression-rollers.
Figure 23:
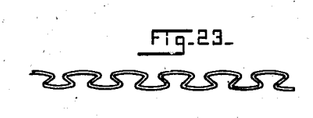
Fig. 23 illustrates approximately the appearance of the paper after having relaxed somewhat from having been compressed by its passage between the said rollers.
Figure 24:
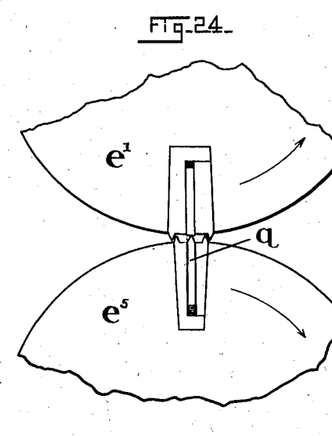
Fig. 24 is an end elevation of portions of the compression-rollers and shows also a certain cutting-off device carried thereby.

The front (free) ends of the rods $p'$ are flattened and broadened, as at $p^2$, Figs. 17, 18, and 21, in order that the semicircular portions of the corrugated paper seen in Figs. 19 and 20 may be expanded and flattened, as in Fig. 21, just before the corrugated paper enters between the compressing-rolls $e'$ $e^5$ to be compressed into the form shown in Fig. 22. When the compressed paper passes beyond the influence of the rolls $e'$ $e^5$, it gradually relaxes and assumes the form shown in Fig. 23, thus providing a plaited sheet that is springy and specially suitable for egg-cushions, bottle-wrappers, stair-pads, and the like articles.

In order to retain the edges of the corrugated paper in proper position as the web of paper is fed through the machine, I provide at the opposite edges of said machine slightly shorter rods $p^3$, that are also supported in the cross-bar $p$ directly over the outer rod $p'$ on each side of the machine. Between the rolls $k'$ and $e^5$ is a cross-bar $p^4$, in which are mounted certain short rods or fingers $i^2$, that serve as continuations or substitutes for the flexible belts $i$, and thus retain the paper in its corrugated form until it is presented to the compression-rolls.

The operation of the described machine is as follows, it being assumed that a roll of paper is mounted at the rear end of the said machine—that is to say, adjacent to the left-hand end of the machine of Fig. 1: The web of paper is first carried upward over the straight edge of the moldboard $g$ and thence is drawn forward on said moldboard and caused to conform to the gradually-curved form of said board until the front edge $g^2$ of said board is reached, when the curved end of the paper is passed beneath the upturned free ends of the rods $h$ and is immediately drawn forward by the frictional action of the flexible belts $i$. At the point of entrance of the paper the ends of rods $h$ are a considerable distance apart and the flexible belts are in almost the same curved plane as the said rods, so that the paper is only very slightly deflected and crimped longitudinally. As the said paper passes forward the rods $h$ draw nearer together and the paper is gradually formed into deeper corrugations, the development of said corrugations being best understood by examining successively the Figs. 8, 9, 10, and 11. When the paper thus corrugated leaves the flattened ends $p^2$ of the rods $p'$, it enters between the rolls $e'$ $e^5$ and is compressed into resilient plaits or folds and cut into given lengths, as already explained.

The operation of the said machine is continuous, and the peculiar means employed for gradually transforming the paper from its original flat form to the longitudinally corrugated and plaited form operates without any appreciable inclination to strain the paper unequally and tear it. Two or more thicknesses of paper may be passed through the machine and corrugated with equal facility, and it will be obvious that the plaiting and cutting rolls $e'$ $e^5$ could be removed and the corrugated product run through the machine, also that other forms of cutting mechanism operating while the paper is traveling continuously could be substituted for the cutter here illustrated and described without in any degree interfering with the operation of the corrugating and plaiting mechanism.

Having thus described my invention, I claim—

1. In combination, mechanism for feeding a web of paper, a moldboard, a system of yielding belts and rigid guide-rods coacting to carry the paper and gradually transform the web from a flat to a longitudinally-corrugated form.

2. The combination of rigid guide-rods, and yielding belts, means for curving a web of paper and feeding it to the yielding belts, and means for causing the belts and rods to coact to contract the web in width and corrugate the same.

3. In combination rigid guide-rods and yielding belts, the said belts opening in such relation to the guide-rods as to convey a web of paper and gradually contracting the paper in width and corrugating it longitudinally.

4. In combination, mechanism for feeding a web of paper, and mechanism for corrugating the same consisting of a moldboard, a system of traveling belts, and rigid guide-rods located between the said belts.

5. In combination rigid guide-rods having their ends arranged in an arc, the said rods converging at their opposite ends and a yielding belt coacting with the rods.

6. In combination rigid guide-rods, yielding belts coacting with the guide-rods for contracting a web of paper transversely and corrugating it, and means for varying the relative distance apart of the rods.

7. In combination, mechanism for feeding a web of paper, mechanism for corrugating and plaiting said paper, means for cutting the plaited product into given lengths, and means for compressing and binding together the cut ends of said product.

8. In combination, a frame, rigid guide-rods arranged in an arc at one end and converging toward the opposite end, yielding belts coacting therewith, hangers for the rods, and means for moving the hangers transversely of the frame.

9. In combination, rigid guide-rods arranged in an arc at one end and converging toward the opposite end, yielding belts coacting with the rods, means for curving a web of paper and feeding it to the yielding belts, and means for causing the belts and rods to coact to contract the web in width and corrugate the same.

10. The combination of rigid guide-rods, and yielding belts coöperating therewith for simultaneously contracting a web of paper in width and corrugating the same.

Signed at Norwich, Connecticut, this 26th day of April, 1902.

WALTER L. ALLEN.

Witnesses:
FRANK H. ALLEN,
FRANK S. DEWIRE.